US012794742B2

(12) United States Patent
Chi et al.

(10) Patent No.: US 12,794,742 B2
(45) Date of Patent: Nov. 10, 2026

(54) METHOD AND APPARATUS OF ORBITAL ANGULAR MOMENTUM (OAM) MODE INDICATION

(71) Applicant: Beijing Xiaomi Mobile Software Co., Ltd., Beijing (CN)

(72) Inventors: Liangang Chi, Beijing (CN); Gaoming Duan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 12 days.

(21) Appl. No.: 18/879,642

(22) PCT Filed: Jun. 30, 2022

(86) PCT No.: PCT/CN2022/103162
§ 371 (c)(1),
(2) Date: Dec. 27, 2024

(87) PCT Pub. No.: WO2024/000527
PCT Pub. Date: Jan. 4, 2024

(65) Prior Publication Data
US 2025/0219878 A1 Jul. 3, 2025

(51) Int. Cl.
*H04K 1/10* (2006.01)
*H04B 17/309* (2015.01)
*H04L 27/00* (2006.01)

(52) U.S. Cl.
CPC ....... *H04L 27/0012* (2013.01); *H04B 17/309* (2015.01)

(58) Field of Classification Search
CPC .. H04L 27/0012; H04L 5/0048; H04B 17/309
(Continued)

(56) References Cited

U.S. PATENT DOCUMENTS

| | | | | |
|---|---|---|---|---|
| 2022/0078780 A1* | 3/2022 | Choi | .................... | H04B 7/0456 |
| 2022/0408426 A1* | 12/2022 | Horn | .................... | H04W 72/51 |
| 2023/0171056 A1* | 6/2023 | Huang | .................... | H04W 24/02<br>370/328 |

FOREIGN PATENT DOCUMENTS

| | | |
|---|---|---|
| CN | 112737714 A | 4/2021 |
| CN | 112803975 A | 5/2021 |

(Continued)

OTHER PUBLICATIONS

ISA State Intellectual Property Office of the People's Republic of China, International Search Report Issued in Application No. PCT/CN2022/103162, Mar. 22, 2023, WIPO, 6 pages.

*Primary Examiner* — Zewdu A Kassa
(74) *Attorney, Agent, or Firm* — Volpe Koenig

(57) ABSTRACT

The present disclosure provides a method and apparatus of an orbital angular momentum (OAM) modes indication, and relates to the technical field of mobile communications. According to the method of OAM modes indication provided by the embodiments of the present disclosure, a second device reports first indication information to a first device, and instructs the first device to select an OAM mode as a target OAM mode for transmitting a target signal or control signaling according to the first indication information; the first device receives the first indication information reported by the second device; and selects an OAM mode as a target OAM mode for transmitting a target signal or control signaling according to the first indication information.

18 Claims, 8 Drawing Sheets

(58) Field of Classification Search
USPC ................ 375/260, 261, 259, 219, 295, 316
See application file for complete search history.

(56) References Cited

FOREIGN PATENT DOCUMENTS

| | | | |
|---|---|---|---|
| CN | 112887989 | A | 6/2021 |
| CN | 112994832 | A | 6/2021 |
| CN | 113747575 | A | 12/2021 |
| CN | 113765550 | A | 12/2021 |
| WO | 2022/000400 | A1 | 1/2022 |

* cited by examiner

METHOD AND APPARATUS OF ORBITAL ANGULAR MOMENTUM (OAM) MODE INDICATION

CROSS-REFERENCE TO RELATED APPLICATION

The present application is a U.S. National Stage of International Application No. PCT/CN2022/103162, filed on Jun. 30, 2022, the contents of which are incorporated herein by reference in their entirety.

TECHNICAL FIELD

The present disclosure relates to the field of mobile communication technologies, and in particular, to a method and apparatus of orbital angular momentum (OAM) modes indication.

BACKGROUND

With the continuous development of wireless communication, the requirements for communication capabilities are getting higher and higher. For future application scenarios such as Augmented Reality (AR)/Virtual Reality (VR), Internet of Vehicles and Internet of Things, ultra-high speed, ultra-low delay and ultra-large bandwidth communication have become the norm. Based on the characteristics of orbital angular momentum (OAM) communication, OAM communication may be applied to mobile communication with ultra-high speed, ultra-low delay and ultra-large bandwidth. In the mobile communication system, the transmission of some target signals or control signaling needs high reliability, which requires that these signals or signaling need high transmission quality. In OAM communication, how to transmit the target signal or control signaling in a high reliability channel is an urgent problem.

SUMMARY

The present disclosure provides a method and apparatus of OAM modes indication, which may ensure the reliability of transmission of a target signal.

Embodiments of a first aspect of the present disclosure provide a method of OAM modes indication, the method being performed by a first device and including: receiving first indication information reported by a second device; and selecting, in response to the first indication information, an OAM mode as a target OAM mode for transmitting a target signal or control signaling.

In some embodiments of the present disclosure, the first indication information may be any one of the following, including: information of the first OAM mode; measurement values of respective OAM modes; information of an antenna port corresponding to the first OAM mode; and measurement values of respective antenna ports corresponding to the respective OAM modes; where the first OAM mode is an OAM mode with a best transmission quality among available OAM modes determined by the second device according to the measurement values of the respective OAM modes.

In some embodiments of the present disclosure, the measurement values of the respective OAM modes or the measurement values of respective antenna ports corresponding to the respective OAM modes include any one of: a signal to interference plus noise ratio (SINR) measurement value of the corresponding OAM mode signal, a reference signal receiving power (RSRP) measurement value of the corresponding OAM mode signal, a reference signal receiving quality (RSRQ) measurement value of the corresponding OAM mode signal, and a received signal strength indicator (RSSI) measurement value of the corresponding OAM mode signal.

In some embodiments of the present disclosure, the method further includes: determining the target signal or control signaling carried by the target OAM mode.

In some embodiments of the present disclosure, the determining the target signal or control signaling carried by the target OAM mode, including: determining, by the first device, the target signal or control signaling carried by the target OAM mode.

In some embodiments of the present disclosure, the method further includes: instructing the second device to receive a corresponding target signal or control signaling on the target OAM mode.

In some embodiments of the present disclosure, the instructing the second device to receive a corresponding target signal or control signaling on the target OAM, including: instructing the second device to receive the corresponding target signal or control signaling on the target OAM through a protocol agreement; or sending second indication information to the second device, to instruct the second device to receive the corresponding target signal or control signaling on the target OAM mode, where the second indication information includes information of the target OAM mode.

In some embodiments of the present disclosure, the determining the target signal or control signaling carried by the target OAM mode, including: determining, according to a predetermined protocol agreement, the target signal or control signaling carried by the target OAM mode.

In some embodiments of the present disclosure, in a case that respective OAM modes are mapped with corresponding antenna ports, the method further includes: maintaining or adjusting mapping relationships between the respective OAM modes and the antenna ports, so that the target OAM mode is mapped to a target antenna port, and the target antenna port receives the corresponding target signal or control signaling.

In some embodiments of the present disclosure, the sending second indication information to the second device, to instruct the second device to receive the corresponding target signal or control signaling on the target OAM mode, where the second indication information includes information of the target OAM, including: indicating, in response to determining that the respective OAM modes are not mapped with corresponding antenna ports, the target OAM mode to the second device through the second indication information, so as to instruct the second device to receive the corresponding target signal or control signaling on the target OAM mode.

In some embodiments of the present disclosure, the target signal or control signaling includes: a phase tracking reference signal (PT-RS), radio resource control (RRC) signaling, an enhanced media access control (MAC) control element (CE), and physical layer control information.

Embodiments of a second aspect of the present disclosure provide a method of OAM modes indication, being performed by a second device and including: reporting first indication information to a first device, for the first device to select an OAM mode as a target OAM mode for transmitting a target signal or control signaling according to the first indication information.

In some embodiments of the present disclosure, the first indication information may be any one of the following, including: information of the first OAM mode; measurement values of respective OAM modes; information of an antenna port corresponding to the first OAM mode; and measurement values of respective antenna ports corresponding to the respective OAM modes; where the first OAM mode is an OAM mode with a best transmission quality among available OAM modes determined by the second device according to the measurement values of the respective OAM modes.

In some embodiments of the present disclosure, the method further includes: determining an OAM mode corresponding to a maximum measurement value among the available OAM modes as the first OAM mode; or determining, among the available OAM modes, an OAM mode corresponding to an antenna port with a maximum measurement value as the first OAM mode.

In some embodiments of the present disclosure, the measurement values of the respective OAM modes or the measurement values of respective antenna ports corresponding to the respective OAM modes include any one of: a signal to interference plus noise ratio (SINR) measurement value of the corresponding OAM mode signal, a reference signal receiving power (RSRP) measurement value of the corresponding OAM mode signal, a reference signal receiving quality (RSRQ) measurement value of the corresponding OAM mode signal, and a received signal strength indicator (RSSI) measurement value of the corresponding OAM mode signal.

In some embodiments of the present disclosure, the method further includes: receiving indication information according to the target signal or control signaling of the first device, and receiving a corresponding target signal or control signaling on the target OAM mode.

In some embodiments of the present disclosure, the receiving indication information according to the target signal or control signaling of the first device, and receiving a corresponding target signal or control signaling on the target OAM mode, including: receiving second indication information sent by the first device, and receiving, in response to the second indication information, the corresponding target signal or control signaling on the target OAM mode indicated by the second indication information.

In some embodiments of the present disclosure, in response to the target signal or control signaling carried by the target OAM mode being determined according to a protocol agreement, receiving the corresponding target signal or control signaling on the target OAM mode according to the protocol agreement.

In some embodiments of the present disclosure, in a case that respective OAM modes are mapped with corresponding antenna ports, the method further includes: receiving the target signal or control signaling at a target antenna port.

In some embodiments of the present disclosure, the target signal or control signaling includes: a phase tracking reference signal (PT-RS), radio resource control (RRC) signaling, an enhanced media access control (MAC) control element (CE), and physical layer control information.

In some embodiments of the present disclosure, determining the target signal or control signaling includes: the target signal or control signaling carried by the target OAM mode determined by the first device; or determining the target signal or control signaling carried by the target OAM mode determined according to a predetermined protocol agreement.

Embodiments of a third aspect of the present disclosure provide an apparatus of OAM modes indication, which is applied to a first device and includes: a receiving unit, configured receive first indication information reported by a second device; and a determining unit, configured to select, in response to the first indication information, an OAM mode as a target OAM mode for transmitting a target signal or control signaling.

Embodiments of a fourth aspect of the present disclosure provide an apparatus of OAM modes indication, which is applied to a second device and includes: a first sending unit, configured to report first indication information to a first device, for the first device to select an OAM mode as a target OAM mode for transmitting a target signal or control signaling according to the first indication information.

Embodiments of a fifth aspect of the present disclosure provide a communication device, including: a transceiver; a memory; a processor, connected to the transceiver and the memory, respectively, and configured to control radio signal transmission and reception of the transceiver by executing computer-executable instructions on the memory, and can realize the method described in the embodiments of the first aspect or the embodiments of the second aspect of the present disclosure.

Embodiments of a sixth aspect of the present disclosure provide a computer storage medium, where the computer storage medium stores computer executable instructions; after the computer executable instructions are executed by a processor, the method described in the embodiments of the first aspect or the embodiments of the second aspect of the present disclosure can be realized.

Embodiments of the present disclosure provide a method and apparatus of OAM modes indication, the first device selects an OAM mode as the target OAM mode for transmitting the target signal or control signaling according to the first indication information reported by the second device, and transmits the target signal or control signaling on the selected OAM mode, thus ensuring the reliability of the target signal or control signaling.

Additional aspects and advantages of the present disclosure will be given in part in the following description, and some will become apparent from the following description, or will be learned through the practice of the present disclosure.

BRIEF DESCRIPTION OF DRAWINGS

The above-mentioned and/or additional aspects and advantages of the present disclosure will be apparent and easily understood from the following description of embodiments taken in conjunction with accompanying drawings, in which.

DETAILED DESCRIPTION

Figure 1:
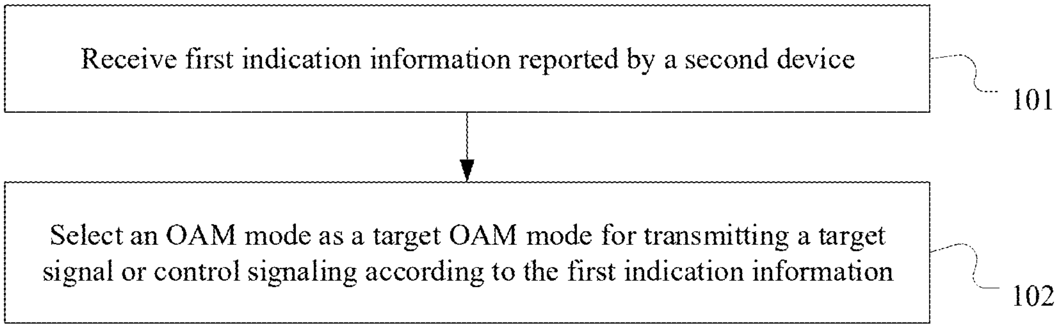
FIG. 1 is a flowchart of a method of OAM modes indication according to an embodiment of the present disclosure.

Hereinafter, embodiments of the present disclosure will be described in detail, examples of which are illustrated in the accompanying drawings, where the same or similar reference numerals from beginning to end indicate the same or similar components or components having the same or similar functions throughout. Embodiments described below by referring to the accompanying drawings are examples and are intended to explain the present disclosure, and should not be construed as limiting the present disclosure.

With the continuous development of wireless communication, the requirements for communication capabilities are getting higher and higher. For future application scenarios such as AR/VR, Internet of Vehicles and Internet of Things, ultra-high speed, ultra-low delay and ultra-large bandwidth communication have become the norm. Based on the characteristics of OAM communication, OAM communication may be applied to mobile communication with ultra-high speed, ultra-low delay and ultra-large bandwidth. In the mobile communication system, the transmission of some target signals or control signaling needs high reliability, which requires that these signals or signaling need high transmission quality. In OAM communication, how to transmit the target signal or control signaling in a high reliability channel is an urgent problem.

Therefore, the present disclosure provides a method and apparatus of OAM modes indication, which can ensure the reliability of target signal or control signaling transmission.

The method and apparatus of OAM modes indication provided in the present disclosure are described in detail below in conjunction with the accompanying drawings.

FIG. 1 shows a flowchart of a method of OAM modes indication according to an embodiment of the present disclosure. As shown in FIG. 1, the method is performed by a first device, which may be, but is not limited to, a base station, and includes the following steps.

At step 101, receiving first indication information reported by a second device.

In the embodiment of the present disclosure, the second device may be a terminal communicating with the first device or a relay device communicating with the first device, and the specific embodiment of the present disclosure does not limit this.

In the embodiment of the present disclosure, in an OAM communication system, OAM beams are orthogonal to each other. In theory, there are infinite kinds of OAM modes, and each OAM mode can transmit signals. After receiving the first indication information, the first device will select an OAM mode as a target OAM mode for transmitting a target signal or control signaling according to the first indication information.

What needs to be explained here is what kind of OAM mode the target OAM mode is selected according to the first indication information, which may be an OAM mode with the best transmission quality among all OAM modes, an OAM mode with the second best transmission quality, or other available OAM modes. Because the target signal and control signaling have high or extremely high requirements on the reliability of the transmission channel, generally, when selecting the target OAM mode, the OAM mode with the best transmission quality among the available OAM modes is selected first. Specific embodiments of the present disclosure do not limit this, as long as it is not occupied by other signals and can transmit target signals or control signaling.

In the OAM communication system, the transmission quality of each OAM mode is different. The transmission quality of OAM mode can be obtained by measuring a measurement signal in OAM mode. The higher the measurement value, the higher the transmission quality of OAM mode.

In addition, it should be noted that in the OAM communication system, a corresponding antenna port may further be set for an OAM mode, and a transmission quality of the OAM mode may further be obtained by measuring a measurement value of the antenna port corresponding to the OAM mode, and the measurement value of the antenna port corresponding to the OAM mode corresponds to the transmission quality of OAM mode.

The embodiments of the present disclosure do not limit this in terms of the specific means by which the transmission quality of the different OAM modes is obtained.

In some embodiments of the present disclosure, the first indication information may be any one of the following: information of the first OAM mode; measurement values of respective OAM modes; information of an antenna port corresponding to the first OAM mode; and measurement values of respective antenna ports corresponding to the respective OAM modes; and where the first OAM mode is an OAM mode with a best transmission quality among available OAM modes determined by the second device according to the measurement values of the respective OAM modes.

When reporting the indication information, the second device may use but is not limited to the following methods.

When the second device measures a transmission signal in each OAM mode and obtains a measurement value of each OAM mode, it may directly report the obtained measurement value of each OAM mode to the first device. Or, the measurement value of each OAM mode can be processed locally in the second device, and an OAM mode with the highest available OAM mode measurement value is selected as the first OAM mode, the measurement value of the first OAM mode is the highest, which is an OAM mode with the best transmission quality among the available OAM modes, and the selected first OAM mode is reported to the first device.

When each OAM mode is configured with a corresponding antenna port, the second device may further measure a transmission signal of the antenna port corresponding to each OAM mode to obtain a measurement value of the antenna port corresponding to each OAM mode. After obtaining the measurement value of the antenna port corresponding to each OAM mode, the second device can directly report the measurement value of the antenna port corresponding to each OAM mode to the first device. The measurement value of the antenna port corresponding to the OAM mode may also be processed locally in the second device, and an antenna port with the highest measurement value among the available OAM modes is selected. Because there is a mapping relationship between the antenna port and the OAM mode, a measurement value of the antenna port is the highest, indicating that the transmission quality of the selected antenna port is the best among the available antenna ports, that is, the transmission quality of the OAM mode corresponding to the selected antenna port is the best. The second device takes the OAM mode corresponding to the selected antenna port with the highest measurement value as the first OAM mode, and when reporting, the second device may directly report the first OAM mode to the first device, or report information of the antenna port corresponding to the first OAM mode to the first device, which is not limited by the specific embodiment of the present disclosure.

At step 102, selecting an OAM mode as a target OAM mode for transmitting a target signal or control signaling according to the first indication information.

In the embodiment of the present disclosure, when an OAM mode is selected as the target OAM mode for transmitting the target signal or control signaling according to the first indication information, the OAM mode with the best transmission quality among the available OAM modes is preferentially selected. The specific implementation can be achieved through, but is not limited to, the following methods.

In response to the first indication information being the information of the first OAM mode, since the first OAM mode is an OAM mode corresponding to a maximum measurement value among available OAM modes selected by the second device locally from the measurement values of the respective OAM modes or the measurement values of respective antenna ports corresponding to the respective OAM modes, the first device may directly use the first OAM mode corresponding to the information of the first OAM mode as the target OAM mode for transmitting the target signal or control signaling when receiving the information of the first OAM mode, i.e., the first OAM mode is taken as the OAM mode with the best transmission quality among the available OAM modes for transmitting the target signal or control signaling.

In response to the first indication information being the measurement values of the respective OAM modes, the OAM mode corresponding to a maximum measurement value among available OAM modes is selected as the target OAM mode for transmitting the target signal or control signaling, i.e., the OAM mode corresponding to the maximum measurement value among the available OAM modes is taken as the OAM mode with the best transmission quality among the available OAM modes for transmitting the target signal or control signaling.

In response to the first indication information being the information of the antenna port corresponding to the first OAM mode, receiving the information of the antenna port indicates that the OAM mode is mapped to a corresponding antenna port, and there is a mapping relationship between the antenna port and the OAM mode. Knowing the information of the antenna port, the corresponding first OAM mode may be obtained according to the information of the antenna port and the mapping relationship between the antenna port and the OAM mode. The first OAM mode is taken as the target OAM mode for transmitting the target signal or control signaling, i.e., the first OAM mode is taken as the OAM mode with the best transmission quality among the available OAM modes for transmitting the target signal or control signaling.

In response to the first indication information being the measurement values of respective antenna ports corresponding to the respective OAM modes, selecting an antenna port with a maximum measurement value among the antenna ports corresponding to the available OAM modes. An OAM mode corresponding to the selected antenna port is determined according to the selected antenna port and a mapping relationship between the antenna port and the OAM mode, and the OAM mode corresponding to the selected antenna port is taken as the target OAM mode for transmitting the target signal or control signaling, i.e., the OAM mode corresponding to the antenna port with the maximum measurement value among the available OAM mode is taken as the OAM mode with the best transmission quality among the available OAM modes for transmitting the target signal or control signaling.

To sum up, according to the method of OAM modes indication provided by the embodiment of the present disclosure, the first device selects an OAM mode as the target OAM mode for transmitting the target signal or control signaling according to the first indication information reported by the second device, and transmits the target signal or control signaling on the selected OAM mode, thus ensuring the reliability of the target signal or control signaling.

Figure 2:
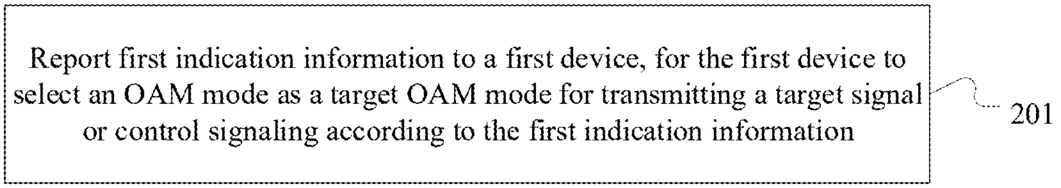
FIG. 2 is a flowchart of a method of OAM modes indication according to an embodiment of the present disclosure.

FIG. 2 shows a flowchart of a method of OAM modes indication according to an embodiment of the present disclosure. The method is applied to a second device, which may be a terminal or a relay, and the specific embodiment of the present disclosure does not limit this. Based on the embodiment shown in FIG. 1, as shown in FIG. 2, the following steps may be included.

At step 201, reporting first indication information to a first device, for the first device to select an OAM mode as a target OAM mode for transmitting a target signal or control signaling according to the first indication information.

In the embodiment of the present disclosure, in an OAM communication system, OAM beams are orthogonal to each other. In theory, there are infinite kinds of OAM modes, and each OAM mode can transmit signals, but the transmission quality of each OAM mode is different. In order to ensure the reliability of target signal or control signaling transmission, it is necessary to use the OAM mode with the best transmission quality among the available OAM modes to transmit the target signal. The specific acquisition method of the transmission quality of OAM mode may be carried out by but not limited to measuring the measurement signal in each OAM mode, and a measurement value of the transmission quality of OAM mode in each OAM mode may be obtained by measurement, which may be measured based on different signals, and the specific embodiment of the present disclosure does not limit this. After measuring the signals in each OAM mode, the transmission quality of different OAM modes may be determined based on the measurement values. The higher the measurement value, the higher the transmission quality of OAM mode.

It should be noted that in the OAM communication system, a corresponding antenna port may further be set for an OAM mode, and a transmission quality of the OAM mode may further be obtained by measuring a measurement value of the antenna port corresponding to the OAM mode, and the measurement value of the antenna port corresponding to the OAM mode corresponds to the transmission quality of OAM mode. The higher the measurement value of the antenna port, the higher the transmission quality of the antenna port and the higher the transmission quality of the OAM mode corresponding to the antenna port.

When reporting the indication information, the second device may use but is not limited to the following methods.

When the second device measures a transmission signal in each OAM mode and obtains a measurement value of each OAM mode, it may directly report the obtained measurement value of each OAM mode to the first device. Or, the measurement value of each OAM mode can be processed locally in the second device, and an OAM mode with the highest available OAM mode measurement value is selected as the first OAM mode, the measurement value of the first OAM mode is the highest, which is an OAM mode with the best transmission quality among the available OAM modes, and the selected first OAM mode is reported to the first device.

When each OAM mode is configured with a corresponding antenna port, the second device may further measure a transmission signal of the antenna port corresponding to each OAM mode to obtain a measurement value of the antenna port corresponding to each OAM mode. After obtaining the measurement value of the antenna port corresponding to each OAM mode, the second device can directly report the measurement value of the antenna port corresponding to each OAM mode to the first device. The measurement value of the antenna port corresponding to the OAM mode may also be processed locally in the second device, and an antenna port with the highest measurement value among the available OAM modes is selected. Because there is a mapping relationship between the antenna port and the OAM mode, a measurement value of the antenna port is the highest, indicating that the transmission quality of the selected antenna port is the best among the available antenna ports, that is, the transmission quality of the OAM mode corresponding to the selected antenna port is the best. The second device takes the OAM mode corresponding to the selected antenna port with the highest measurement value as the first OAM mode, and when reporting, the second device may directly report the first OAM mode to the first device, or report information of the antenna port corresponding to the first OAM mode to the first device, which is not limited by the specific embodiment of the present disclosure.

Since the transmission quality of OAM mode may be obtained in the above way, and there is a mapping relationship between an OAM mode and an antenna, when the second device reports the first indication information, the first indication information may be any one of the following: information of the first OAM mode; measurement values of respective OAM modes; information of an antenna port corresponding to the first OAM mode; and measurement values of respective antenna ports corresponding to the respective OAM modes; where the first OAM mode being an OAM mode with a best transmission quality among available OAM modes determined by the second device according to the measurement values of the respective OAM modes.

To sum up, according to the method of OAM modes indication provided by the embodiment of the present disclosure, after obtaining information related to the transmission quality of OAM modes, the second device reports indication information to the first device for the first device to select a target OAM mode for transmitting a target signal or control signaling. In response to the indication information, the first device selects a target OAM mode for transmitting the target signal or control signaling, and transmits the target signal or control signaling on the selected OAM mode, thus ensuring the reliability of the target signal or control signaling.

In some embodiments of the present disclosure, the measurement values of the respective OAM modes may be, but not limited to, any one of the following, including: a signal to interference plus noise ratio (SINR) measurement value of the corresponding OAM mode signal, a reference signal receiving power (RSRP) measurement value of the corresponding OAM mode signal, a reference signal receiving quality (RSRQ) measurement value of the corresponding OAM mode signal, and a received signal strength indicator (RSSI) measurement value of the corresponding OAM mode signal.

In some embodiments of the present disclosure, the target signal or control signaling includes: a phase tracking reference signal (PT-RS), radio resource control (RRC) signaling, an enhanced media access control (MAC) control element (CE), and physical layer control information.

In some embodiments of the present disclosure, the second device, after obtaining the measurement value of each OAM mode, may locally process and select an optimal OAM mode among the available OAM modes, and after selecting the optimal OAM mode, i.e., the first OAM mode, report the first OAM mode to the first device. Or the second device may directly report the obtained measurement value of each OAM mode to the first device without local processing. The specific method employed by the second device to report to the first device the first indication information used to select an OAM mode for transmitting the target signal or control signaling is not limited in the embodiment of the present disclosure. When the second device adopts local processing to select the first OAM mode, it may be realized by adopting but not limited to the following methods: the second device selects, based on the measurement values, an OAM mode corresponding to a maximum measurement value among the available OAM modes as the first OAM mode and reports the first OAM mode to the first device.

In some embodiments of the present disclosure, the second device selects, based on the measurement values, the OAM mode corresponding to the maximum measurement value among the available OAM modes as the first OAM mode, which may be realized by adopting but not limited to the following methods.

When the measurement values of the respective OAM modes are SINR measurement values, in response to the measurement values of the respective OAM modes being SINR measurement values, select, based on the measurement values of the respective OAM modes, an OAM mode corresponding to a maximum SINR measurement value among the available OAM modes as the first OAM mode.

When the measurement values of the respective OAM modes are RSRP measurement values, in response to the measurement values of the respective OAM modes being RSRP measurement values, the second device selects, based on the measurement values of the respective OAM modes, an OAM mode corresponding to a maximum RSRP measurement value among the available OAM modes as the first OAM mode, and reports the first OAM mode to the first device.

When the measurement values of the respective OAM modes are RSRQ measurement values, in response to the measurement values of the respective OAM modes being RSRQ measurement values, the second device selects, based on the measurement values of the respective OAM modes, an OAM mode corresponding to a maximum RSRQ measurement value among the available OAM modes as the first OAM mode, and reports the first OAM mode to the first device.

When the measurement values of the respective OAM modes are RSSI measurement values, in response to the measurement values of the respective OAM modes being RSSI measurement values, the second device selects, based on the measurement values of the respective OAM modes, an OAM mode corresponding to a maximum RSSI measurement value among the available OAM modes as the first OAM mode, and reports the first OAM mode to the first device.

Based on the first indication information reported by the second device, when the first indication information received by the first device is measurement values of respective OAM modes, the measurement values of the respective OAM modes may be but not limited to any one of the following information, including: a SINR measurement value of the corresponding OAM mode signal, an RSRP measurement value of the corresponding OAM mode signal, an RSRQ measurement value of the corresponding OAM mode signal and an RSSI measurement value of the corresponding OAM mode signal.

In some embodiments of the present disclosure, the first device will select a target OAM mode for transmitting target signal according to the measurement values of the respective OAM modes. Specifically, but not limited to the following methods: selecting, based on the measurement values of the respective OAM modes, an OAM mode corresponding to a maximum measurement value among available OAM modes as the target OAM mode.

In some embodiments of the present disclosure, the first device selects, based on the measurement values of the respective OAM modes, the OAM mode corresponding to the maximum measurement value among the available OAM modes as the target OAM mode, which may be realized by adopting but not limited to the following methods.

When the measurement values of the respective OAM modes in the first indication message received by the first device are SINR measurement values, in response to the measurement values being SINR measurement values, the first device selects, based on the measurement values, an OAM mode corresponding to a maximum SINR measurement value among the available OAM modes as the target OAM mode.

When the measurement values of the respective OAM modes in the first indication message received by the first device are RSRP measurement values, in response to the measurement values being RSRP measurement values, select, based on the measurement values, an OAM mode corresponding to a maximum RSRP measurement value among the available OAM modes as the target OAM mode.

When the measurement values of the respective OAM modes in the first indication message received by the first device are RSRQ measurement values, in response to the measurement value being RSRQ measurement values, select, based on the measurement values, an OAM mode corresponding to a maximum RSRQ measurement value among the available OAM modes as the target OAM mode.

When the measurement values of the respective OAM modes in the first indication message received by the first device are RSSI measurement values, in response to the measurement value being are RSSI measurement values, select, based on the measurement values, an OAM mode corresponding to a maximum RSSI measurement value among the available OAM modes as the target OAM mode.

In some embodiments of the present disclosure, when there is a mapping relationship between an OAM mode and an antenna port, as described above, the second device may obtain a measurement value of the antenna port corresponding to the OAM mode. The second device, after obtaining the measurement value of each OAM mode, may locally process, based on the measurement values of the respective antenna ports corresponding to the respective OAM modes, a selection of an optimal OAM mode among the available OAM modes. After selecting the optimal OAM mode, i.e., the first OAM mode, report the first OAM mode to the first device. Or the second device may directly report the obtained measurement value of the antenna port corresponding to each OAM mode to the first device without local processing. The specific method employed by the second device to report to the first device the first indication information used to select an OAM mode for transmitting the target signal or control signaling is not limited in the embodiment of the present disclosure. When the second device adopts local processing to select the first OAM mode, it may be realized by adopting but not limited to, the following method, which is as follows: the second device selects, based on the measurement values of respective antenna ports corresponding to the respective OAM modes, an OAM mode corresponding to a maximum measurement value among the available OAM modes as the first OAM mode, and reports the first OAM mode to the first device.

In some embodiments of the present disclosure, the measurement values of respective antenna ports corresponding to the respective OAM modes may be any one of the following, including: a SINR measurement value of the corresponding OAM mode signal, an RSRP measurement value of the corresponding OAM mode signal, an RSRQ measurement value of the corresponding OAM mode signal and an RSSI measurement value of the corresponding OAM mode signal.

The description related to the second device selecting based on the measurement values of respective antenna ports corresponding to the respective OAM modes, an OAM mode corresponding to a maximum measurement value among the available OAM modes as the first OAM mode may be with reference to the second device selecting, based on the measurement values, the OAM mode corresponding to the maximum measurement value among the available OAM modes as the first OAM mode, which may be realized by adopting but not limited to the following methods.

When the measurement values of respective antenna ports corresponding to the respective OAM modes are SINR measurement values, in response to the measurement values of respective antenna ports corresponding to the respective OAM modes being SINR measurement values, the second device selects, based on the measurement values of respective antenna ports corresponding to the respective OAM modes, an OAM mode corresponding to a maximum SINR measurement value among the available OAM modes as the first OAM mode.

When the measurement values of respective antenna ports corresponding to the respective OAM modes are RSRP measurement values, in response to the measurement values of respective antenna ports corresponding to the respective OAM modes being RSRP measurement values, the second device selects, based on the measurement values of respective antenna ports corresponding to the respective OAM modes, an OAM mode corresponding to a maximum RSRP measurement value among the available OAM modes as the first OAM mode.

When the measurement values of respective antenna ports corresponding to the respective OAM modes are RSRQ measurement values, in response to the measurement values of respective antenna ports corresponding to the respective OAM modes being RSRQ measurement values, the second device selects, based on the measurement values of respective antenna ports corresponding to the respective OAM modes, an OAM mode corresponding to a maximum RSRQ measurement value among the available OAM modes as the first OAM mode.

When the measurement values of respective antenna ports corresponding to the respective OAM modes are RSSI measurement values, in response to the measurement values of respective antenna ports corresponding to the respective OAM modes being RSSI measurement values, the second device selects, based on the measurement values of respective antenna ports corresponding to the respective OAM modes, an OAM mode corresponding to a maximum RSSI measurement value among the available OAM modes as the first OAM mode, and reports the first OAM mode to the first device, so that when the first device receives the first OAM mode, selects the first OAM mode as the target OAM mode for transmitting the target signal or control signaling.

In some embodiments of the present disclosure, when the indication information received by the first device is information of the antenna port corresponding to the first OAM mode, in response to information of the antenna port corresponding to the first OAM mode, the first device obtains mapping relationships between the respective OAM modes and the antenna ports, and obtains the first OAM mode corresponding to the antenna port according to the mapping relationships. Further, the first device maintains or adjusts the mapping relationships between the respective OAM modes and the antenna ports, so that the target OAM mode is mapped to a target antenna port.

When the first device receives the first indication information including the measurement values of respective antenna ports corresponding to the respective OAM modes, it may be realized by adopting but not limited to, the following method, which is as follows: the second device selects, based on the measurement values of respective antenna ports corresponding to the respective OAM modes, an OAM mode corresponding to a maximum measurement value among the available OAM modes as the target OAM mode.

When the measurement values of respective antenna ports corresponding to the respective OAM modes in the first indication information are SINR measurement values, in response to the measurement values of respective antenna ports corresponding to the respective OAM modes being SINR measurement values, the first device selects, based on the measurement values of respective antenna ports corresponding to respective OAM modes, an OAM mode corresponding to a maximum SINR measurement value among the available OAM modes as the target OAM mode.

When the measurement values of respective antenna ports corresponding to the respective OAM modes in the first indication information are RSRP measurement values, in response to the measurement values of respective antenna ports corresponding to the respective OAM modes being are RSRP measurement values, the first device selects, based on the measurement values of respective antenna ports corresponding to the respective OAM modes, an OAM mode corresponding to a maximum RSRP measurement value among the available OAM modes as the target OAM mode.

When the measurement values of respective antenna ports corresponding to the respective OAM modes in the first indication information are RSRQ measurement values, in response to the measurement values of respective antenna ports corresponding to the respective OAM modes being RSRQ measurement values, the first device selects, based on the measurement values of the respective antenna ports corresponding to the respective OAM modes, an OAM mode corresponding to a maximum RSRQ measurement value among the available OAM modes as the target OAM mode.

Figure 3:
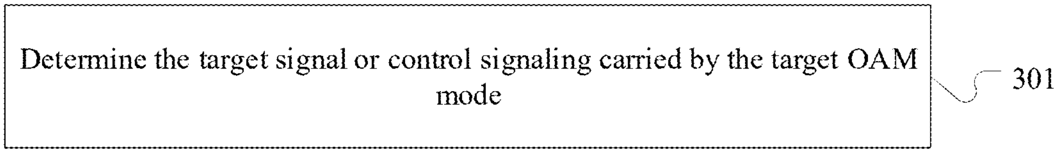
FIG. 3 is a flowchart of a method of OAM modes indication according to an embodiment of the present disclosure.

FIG. 3 shows a flowchart of a method of OAM modes indication according to an embodiment of the present disclosure. The method is performed by a first device, based on the embodiment shown in FIG. 1, as shown in FIG. 3, the following steps may be included.

At step 301, determining the target signal or control signaling carried by the target OAM mode.

The transmission of some target signals or signaling in the mobile communication system needs high reliability, which requires that these signals or signaling need to be transmitted in some channels with high transmission quality. The target signal or control signaling may include, but is not limited to, a PT-RS, RRC signaling, an MAC CE, physical layer control information, and other signals or control signaling. In the embodiment of the present disclosure, it is necessary to determine which target signals or control signaling are transmitted in the determined target OAM mode. When determining the target signal or control signaling, it may be realized in the following method, but not limited to: the target signal or control signaling carried by the target OAM mode may be determined by the first device, or the target signal or control signaling carried by the target OAM mode may be determined according to a predetermined protocol agreement.

To sum up, according to the method of OAM modes indication provided by the embodiment of the present disclosure, the first device selects an OAM mode as the target OAM mode for transmitting the target signal or control signaling according to the first indication information reported by the second device, and transmits the target signal or control signaling on the target OAM mode, thus ensuring the reliability of the target signal or control signaling. In addition, when determining the target signal or control signaling to be transmitted in the target OAM mode, it may be determined based on the protocol or by the first device, which is flexible in implementation and ensures that the target signal or control signaling may be transmitted in the optimal OAM mode among the available OAM modes.

Figure 4:
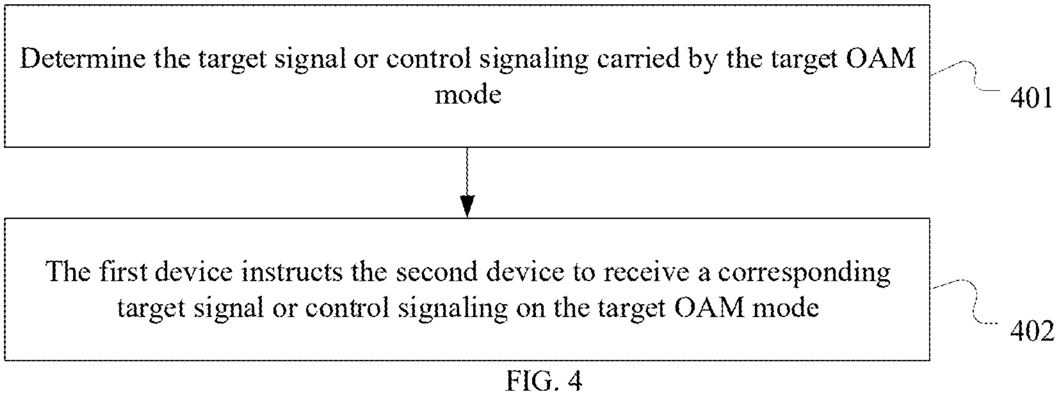
FIG. 4 is a flowchart of a method of OAM modes indication according to an embodiment of the present disclosure.

FIG. 4 shows a flowchart of a method of OAM modes indication according to an embodiment of the present disclosure. The method is performed by a first device, based on the embodiment shown in FIG. 3, as shown in FIG. 4, the following steps may be included.

At step 401, determining the target signal or control signaling carried by the target OAM mode.

In the embodiment of the present disclosure, for the description of determining the target signal or control signaling carried by the target mode, please refer to the description of step 301 in FIG. 3, which will not be repeated here.

At step 402, the first device instructs the second device to receive a corresponding target signal or control signaling on the target OAM mode.

When instructing the second device to receive the corresponding target signal or control signaling on the target OAM mode, the following method may be adopted, but not limited to, including: sending second indication information to the second device, to instruct the second device to receive the corresponding target signal or control signaling on the target OAM mode, where the second indication information includes information of the target OAM mode.

In some embodiments of the present disclosure, when the first device instructs the second device to receive the corresponding target signal or control signaling on the target OAM mode, it may further instruct the second device to receive the corresponding target signal or control signaling on the target OAM mode by sending second indication information to the second device. Specifically, the method further includes: sending, by the first device, the second indication information to the second device, to instruct the second device to receive the corresponding target signal or control signaling on the target OAM mode. When the first device sends the second indication information to the second network device, it may be specifically described based on whether the second network device sets an antenna port associated with the OAM mode.

In some embodiments of the present disclosure, when a target signal or control signaling is transmitted through the OAM mode in a case that the OAM mode is not set with a corresponding antenna port, regardless of which specific OAM mode is determined as the target OAM mode, it is necessary to notify which OAM mode is the target OAM mode. In this case, the first device sends second indication information to the second device to indicate the target OAM mode for transmitting the target signal or control signaling. Therefore, in response to determining that the respective OAM modes are not mapped with the corresponding antenna port, the target OAM mode is indicated to the second device through the second indication information, so as to instruct the second device to receive the corresponding target signal or control signaling on the target OAM mode.

When the OAM mode is not mapped with the corresponding antenna port, the target OAM mode is indicated to the second device through the second indication information, and the second device is instructed to receive the corresponding target signal or control signaling on the target OAM mode, may be achieved through, but not limited to, the following methods.

When the determined target OAM mode is the OAM mode or the OAM mode corresponding to the maximum measurement value of the antenna port corresponding to the OAM mode, since the second device does not know the target OAM mode, if the information of the target OAM mode is not included in the second indication information, the second device will not know which OAM mode to use to receive the target signal or control signaling, so it is necessary to send the information of the selected target OAM mode to the second device. When the target signal or control signaling carried by the target OAM mode is the target signal or control signaling determined according to the predetermined protocol agreement, since the second device can know the target signal or control signaling carried by the target OAM mode according to the predetermined protocol agreement, it is unnecessary to send the information of the target signal or control signaling carried by the target OAM mode to the second device. Therefore, in response to the target signal or control signaling carried by the target OAM mode being the target signal or control signaling agreed by a predetermined protocol and the target OAM mode being the OAM mode or the OAM mode corresponding to the maximum measurement value of the antenna port corresponding to the OAM mode, second indication information is sent to the second device, and the second indication information includes the information of target OAM mode.

When the determined target OAM mode is the first OAM mode or information of the antenna port corresponding to the first OAM mode, although there is no antenna port associated with the OAM mode set in the second device, if the determined target OAM mode is the first OAM mode reported by the second device, the second indication information does not include the information of the target OAM mode, and the second device may also know the antenna port corresponding to the target OAM mode, so it is unnecessary to send the information of the determined target OAM mode to the second device. When the target signal or control signaling carried by the target OAM mode is confirmed by the first device, since the target signal or control signaling is confirmed by the first device and may not be known by the second device in advance, it is necessary to send the information of the target signal or control signaling carried by the target OAM mode to the second device. Therefore, in response to the target signal or control signaling carried by the target OAM mode being the target signal or control signaling confirmed by the first device according to a predetermined protocol and the target OAM mode being the first OAM mode or information of the antenna port information corresponding to the first OAM mode, the second indication information is sent to the second device, where the second indication information includes information of the target signal or control signaling carried by the target OAM mode.

When the determined target OAM mode is the OAM mode or the OAM mode corresponding to the maximum measurement value of the antenna port corresponding to the OAM mode, since the second device does not know the target OAM mode, if the information of the target OAM mode is not included in the second indication information, the second device will not know which OAM mode to use to receive the target signal or control signaling, so it is necessary to send the information of the selected target OAM mode to the second device. When the target signal or control signaling carried by the target OAM mode is confirmed by the first device, since the target signal or control signaling is confirmed by the first device and may not be known by the second device in advance, it is necessary to send the information of the target signal or control signaling carried by the target OAM mode to the second device. Therefore, in response to the target signal or control signaling carried by the target OAM mode being the target signal or control signaling confirmed by the first device and the target OAM mode being the OAM mode or the OAM mode corresponding to the maximum measurement value of the antenna port corresponding to the OAM mode, the second indication information is sent to the second device, where the second indication information includes the information of target OAM mode and information of the target signal or control signaling carried by the target OAM mode.

In some embodiments of the present disclosure, when the OAM mode is configured with a corresponding antenna port, it indicates that no matter which OAM mode is selected by the first device as the target OAM mode, the target antenna port is configured to receive the target signal or control signaling transmitted by the target OAM mode, and the first device does not need to inform the second device of which OAM mode the target OAM mode is. In this case, it is only necessary to send information of the target signal or control signaling carried by the determined target OAM mode to the second device. When the second device is configured with an antenna port associated with OAM mode, sending the second indication information to the second device may be achieved using, but is not limited to, the following method, which includes: in response to the target signal or control signaling carried by the target OAM mode being the one confirmed by the first device and the target OAM mode being the OAM mode or the OAM mode corresponding to the maximum measurement value of the antenna port corresponding to the OAM mode, sending second indication information to the second device, where the second indication information includes information of the target signal or control signaling carried by the target OAM mode.

For the description about information of the target signal or the control signaling, please refer to the above corresponding description, which will not be repeated here.

In some embodiments of the present disclosure, the second device may receive the corresponding target signal or control signaling on the target OAM mode in the form of an indication, and the second device may also receive the corresponding target signal or control signaling on the target OAM mode in the form of a protocol agreement. When the corresponding target signal or control signaling is received by the second device on the target OAM mode through the protocol agreement, it may be realized in the following method, including but not limited to: when the OAM mode is set with a corresponding antenna port, it indicates that no matter which OAM mode is selected by the first device as the target OAM mode, the target antenna port is configured to receive the target signal or control signaling transmitted by the target OAM mode, and the first device does not need to inform the second device of which OAM mode the target OAM mode is. Therefore, in response to the OAM mode mapping with the corresponding antenna port, the second device receives the corresponding target signal or control signaling on the target antenna port.

In some embodiments of the present disclosure, when the target signal or control signaling carried by the target OAM mode is determined according to a predetermined protocol agreement, the first device and the second device know the target signal or control signaling carried by the target OAM mode according to the predetermined protocol agreement, and it is unnecessary for the first device to send the indication information of the target signal or control signaling carried by the target OAM mode to the second device. Moreover, a corresponding antenna port is set based on the OAM mode, and the second device receives indication information of the corresponding target signal or control signaling agreed by the protocol on the target antenna port.

In a specific implementation, in a case that respective OAM modes are mapped with corresponding antenna ports, a mapping relationship between the respective OAM modes and the antenna ports are maintained or adjusted, so that the target OAM mode is mapped to a target antenna port, and the target antenna port receives the corresponding target signal or control signaling.

In some embodiments of the present disclosure, although the OAM mode is not set with a corresponding antenna port, when the selected target OAM mode is the first OAM mode reported by the second device, the second device may know that the selected target OAM mode for transmitting the target signal or control signaling is the first OAM mode even if the selected target OAM mode for transmitting the target signal or control signaling is not indicated to the second device. Therefore, in response to the OAM mode not being set with a corresponding antenna port, the target OAM mode being the first OAM mode, and the target signal or control signaling carried by the target OAM mode being the target signal or control signaling determined according to the predetermined protocol agreement, the second device receives the corresponding target signal or control signaling agreed by the protocol on the agreed first OAM mode.

In addition to the above two cases, the second device may receive the corresponding target signal or control signaling on the target OAM mode based on a protocol agreement, and in other cases, the second device may receive the corresponding target signal or control signaling on the target OAM mode through a protocol agreement, specific embodiments of the present disclosure do not limit to this, and the specific embodiments may be implemented according to actual situations.

To sum up, according to the method of OAM modes indication provided by the embodiment of the present disclosure, the first device selects an OAM mode as the target OAM mode for transmitting the target signal or control signaling according to the first indication information reported by the second device, and transmits the target signal or control signaling on the target OAM mode, thus ensuring the reliability of the target signal or control signaling. In addition, when determining the target signal or control signaling to be transmitted in the target OAM mode, it may be determined based on the protocol or by the first device, which is flexible in implementation and ensures that the target signal or control signaling may be transmitted in the optimal OAM mode among the available OAM modes.

Figure 5:
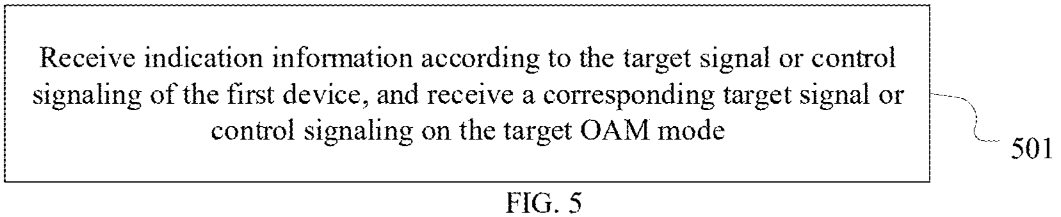
FIG. 5 is a flowchart of a method of OAM modes indication according to an embodiment of the present disclosure.

In some embodiments of the present disclosure, based on the method of the first device sending second indication information to the second device described above, as shown in FIG. 5, the method includes: at 501, receiving indication information according to the target signal or control signaling of the first device, and receiving a corresponding target signal or control signaling on the target OAM mode.

In some embodiments of the present disclosure, receiving indication information according to the target signal or control signaling of the first device, and receiving a corresponding target signal or control signaling on the target OAM mode may be realized by the following method, but not limited to: receiving second indication information sent by the first device, and receiving, in response to the second indication information, the corresponding target signal or control signaling on the target OAM mode indicated by the second indication information.

In some embodiments of the present disclosure, the second device receives second indication information sent by the first device, and receives, in response to the second indication information, the corresponding target signal or control signaling on the target OAM mode indicated by the second indication information. The second device receiving, according to the second indication information, the corresponding target signal or control signaling on the target OAM mode may be realized by the following method, but not limited to: when the second indication information only includes the information of target OAM mode, it indicates that the target signal or control signaling carried by the target OAM mode is determined according to a predetermined protocol, and in response to the second indication information including the information of target OAM mode, the target signal or control signaling agreed by the predetermined protocol is received on the target OAM mode corresponding to the information of target OAM mode.

When the second indication information only includes the information of target signal or control signaling carried by the target OAM mode, it indicates that the OAM mode is set with a corresponding antenna port or the target OAM mode is the first OAM mode reported by the second device, and the target signal or control signaling carried by the target OAM mode is determined by the first device. In response to the second indication information including the information of target signal or control signaling carried by the target OAM mode, the target signal or control signaling corresponding to the information of target signal or control signaling carried by the target OAM mode is received at the target antenna port or the first OAM mode.

In response to the second indication information including the information of target OAM mode and the information of target signal or control signaling carried by the target OAM mode, the target signal or control signaling corresponding to the information of target signal or control signaling carried by the target OAM mode is received on the target OAM mode corresponding to the information of target OAM mode.

In some embodiments of the present disclosure, the corresponding target signal or control signaling may further be received on the target OAM mode according to a protocol agreement. In response to the indication of the protocol agreement, when receiving the corresponding target signal or control signaling on the target OAM mode according to the protocol agreement, the following method may be adopted, but not limited to, including the following.

When the OAM mode is set with a corresponding antenna port, the corresponding target signal or control signaling is received at the target antenna port regardless of the OAM mode selected by the first device. Therefore, in response to the OAM mode being set with a corresponding antenna port and the target signal or control signaling carried by the target OAM mode being the target signal or control signaling agreed in a predetermined protocol, the target signal or control signaling agreed in the protocol is received at the target antenna port according to the protocol agreement.

When the OAM mode is not set with a corresponding antenna port, but the target OAM mode selected by the first device is the first OAM mode reported by the second device, although the second indication information does not include the information of the target OAM mode, the second device may also know the first OAM mode reported by the target OAM mode according to the protocol agreement. Therefore, in response to the OAM mode not being set with a corresponding antenna port and the target OAM mode being the first OAM mode, the target signal or control signaling agreed in the protocol is received at the target antenna port according to the protocol agreement.

To sum up, according to the method of OAM modes indication provided by the embodiment of the present disclosure, the first device selects an OAM mode as the target OAM mode for transmitting the target signal or control signaling according to the first indication information reported by the second device, and transmits the target signal or control signaling on the target OAM mode, thus ensuring the reliability of the target signal or control signaling. In addition, when determining the target signal or control signaling to be transmitted in the target OAM mode, it may be determined based on the protocol or by the first device, which is flexible in implementation and ensures that the target signal or control signaling may be transmitted in the optimal OAM mode among the available OAM modes.

Figure 6:
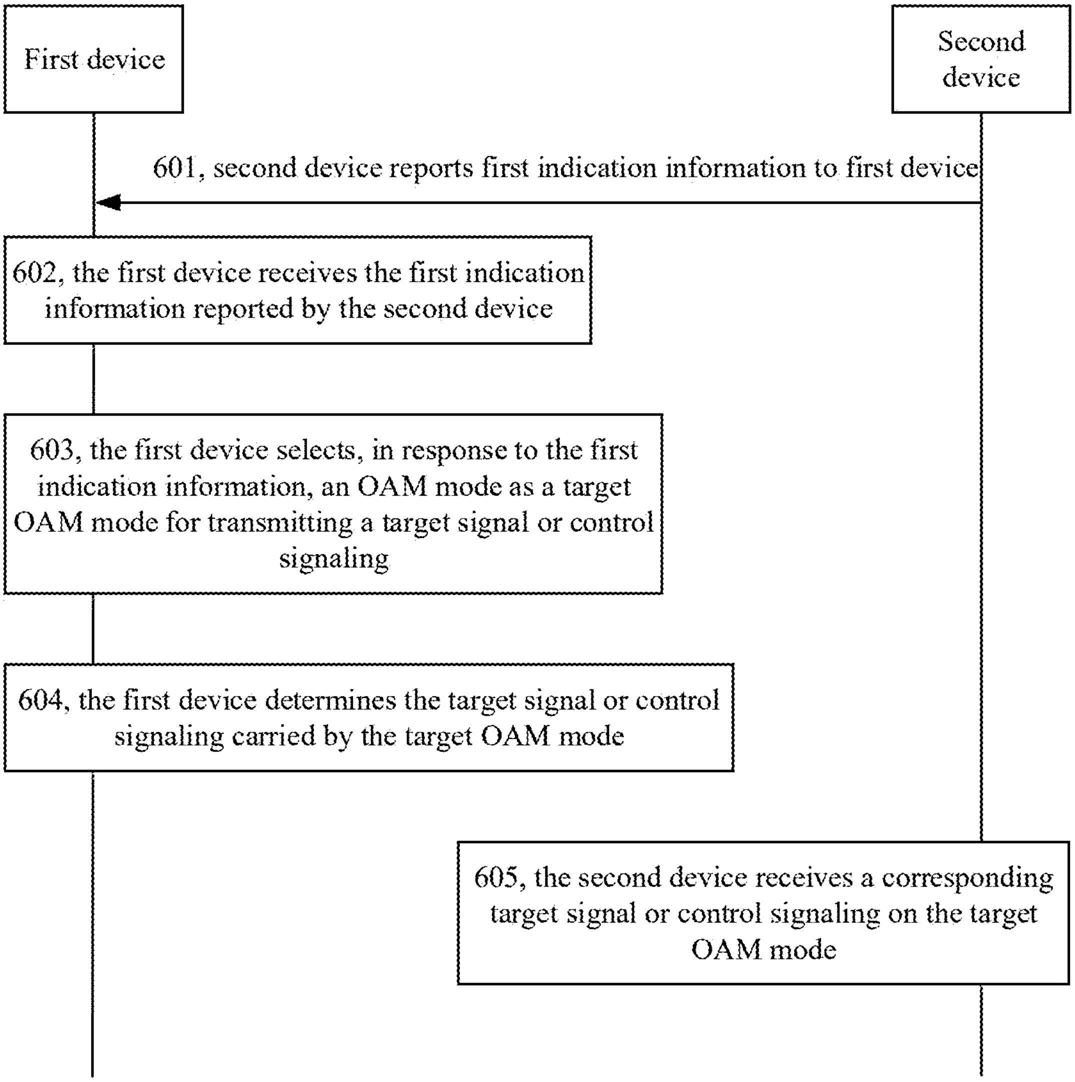
FIG. 6 is a schematic diagram of an interaction process of a method of OAM modes indication according to an embodiment of the present disclosure.

Based on the above description, an embodiment of the present disclosure provides a method of OAM modes indication, as shown in FIG. 6, which includes the following.

At 601, a second device reports first indication information to a first device, for the first device to select an OAM mode as a target OAM mode for transmitting a target signal or control signaling according to the first indication information.

At 602, the first device receives the first indication information reported by the second device.

At 603, the first device selects, in response to the first indication information, an OAM mode as a target OAM mode for transmitting a target signal or control signaling.

At 604, the first device determines the target signal or control signaling carried by the target OAM mode.

At 605, the second device receives a corresponding target signal or control signaling on the target OAM mode.

Figure 7:
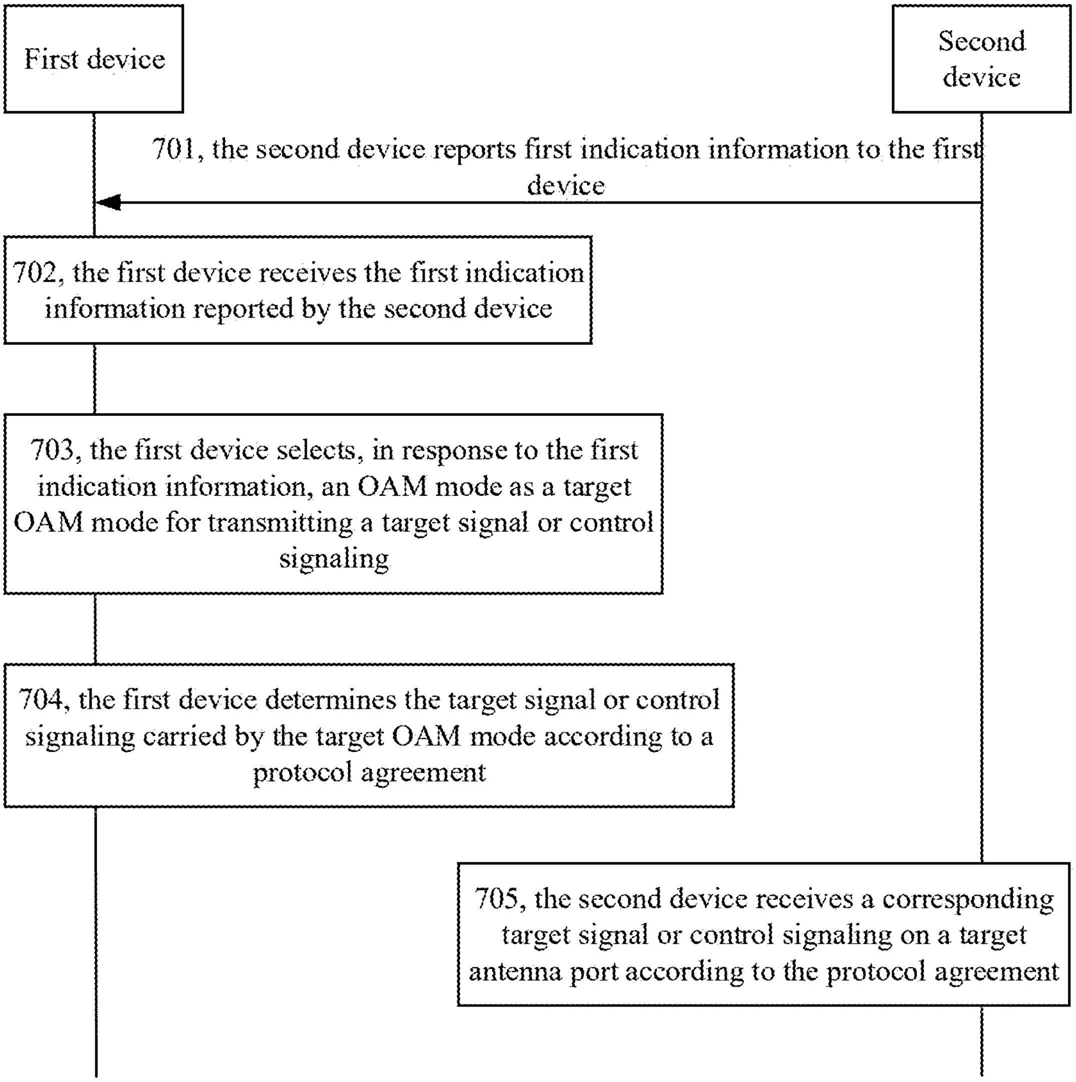
FIG. 7 is a schematic diagram of an interaction process of a method of OAM modes indication according to an embodiment of the present disclosure.

Based on the above description, when receiving the corresponding target signal or control signaling on the target OAM mode according to a protocol agreement, an embodiment of the present disclosure provides a method of OAM modes indication, as shown in FIG. 7, which includes the following.

At 701, a second device reports first indication information to a first device, for the first device to select an OAM mode as a target OAM mode for transmitting a target signal or control signaling according to the first indication information.

At 702, the first device receives the first indication information reported by the second device.

At 703, the first device selects, in response to the first indication information, an OAM mode as a target OAM mode for transmitting a target signal or control signaling.

At 704, the first device determines the target signal or control signaling carried by the target OAM mode according to a protocol agreement.

At 705, the second device receives a corresponding target signal or control signaling on a target antenna port according to the protocol agreement.

For a detailed description of the embodiment of the present disclosure, please refer to the descriptions of related contents in FIGS. 1 to 5, and will not be repeated here.

Figure 8:
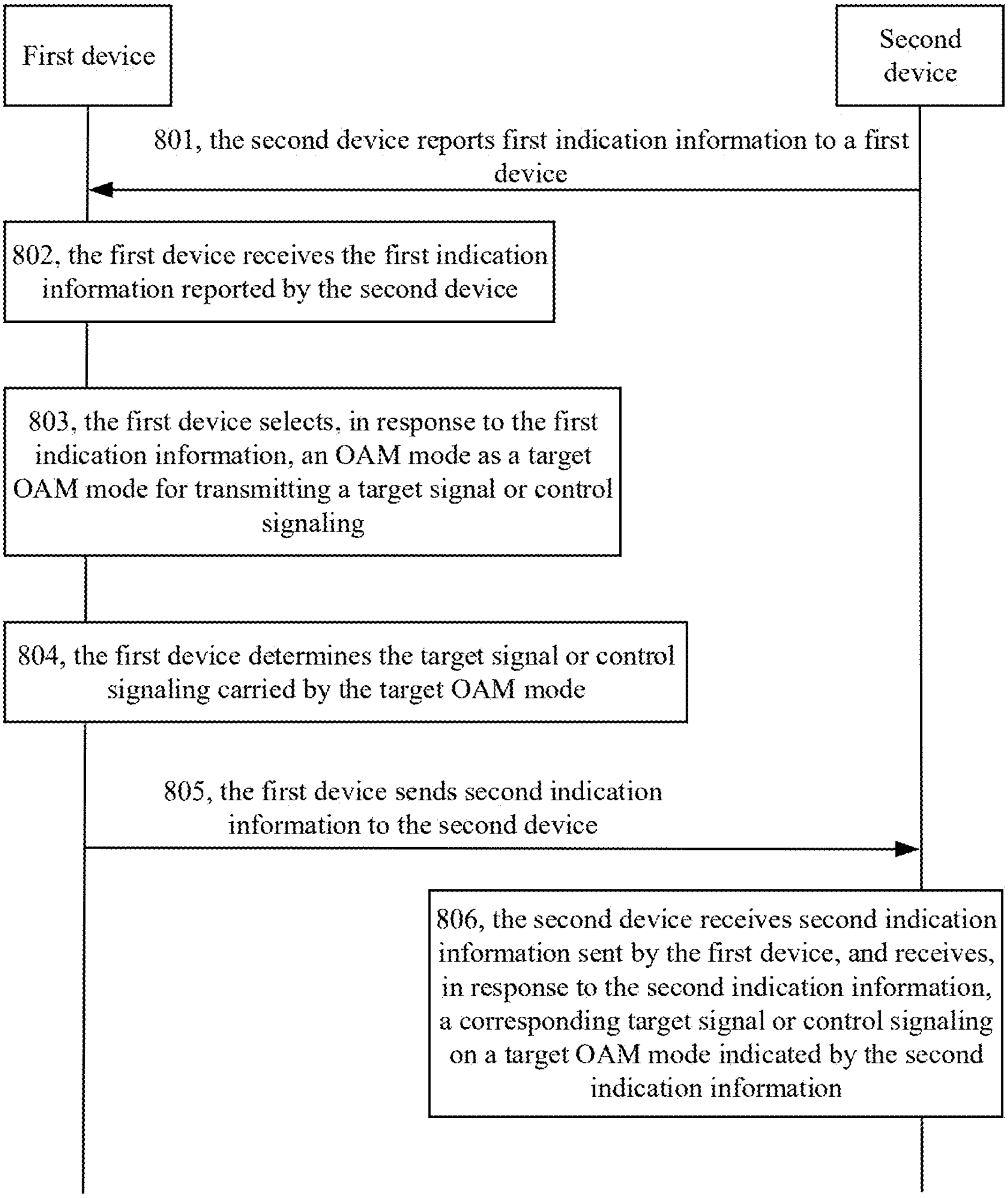
FIG. 8 is a schematic diagram of an interaction process of a method of OAM modes indication according to an embodiment of the present disclosure.

In some embodiments of the present disclosure, when the first device instructs the second device to receive the corresponding target signal or control signaling on the target OAM mode by sending the second indication information to the second device, and the second indication information includes information of the target OAM mode, the following method of OAM modes indication may be adopted, as shown in FIG. 8, which includes the following.

At 801, the second device reports first indication information to a first device, for the first device to select an OAM mode as a target OAM mode for transmitting a target signal or control signaling according to the first indication information.

At 802, the first device receives the first indication information reported by the second device.

At 803, the first device selects, in response to the first indication information, an OAM mode as a target OAM mode for transmitting a target signal or control signaling.

At 804, the first device determines the target signal or control signaling carried by the target OAM mode.

At 805, the first device sends second indication information to the second device, to instruct the second device to receive a corresponding target signal or control signaling on the target OAM mode, where the second indication information includes information of the target OAM mode.

At 806, the second device receives second indication information sent by the first device, and receives, in response to the second indication information, a corresponding target signal or control signaling on a target OAM mode indicated by the second indication information.

For a detailed description of the embodiment of the present disclosure, please refer to the descriptions of related contents in FIGS. 1 to 5, and will not be repeated here.

To sum up, according to the method of OAM modes indication provided by the embodiment of the present disclosure, the first device selects an OAM mode as the target OAM mode for transmitting the target signal or control signaling according to the first indication information reported by the second device, and transmits the target signal or control signaling on the target OAM mode, thus ensuring the reliability of the target signal or control signaling. In addition, when determining the target signal or control signaling to be transmitted in the target OAM mode, it may be determined based on the protocol or by the first device, which is flexible in implementation and ensures that the target signal or control signaling may be transmitted in the optimal OAM mode among the available OAM modes.

Corresponding to the method of OAM modes indication provided in the above embodiments, the present disclosure further provides an apparatus of OAM modes indication. Since the OAM mode indication apparatus provided in the embodiment of the present disclosure corresponds to the method of OAM modes indication provided in the above embodiments, the implementation of the method of OAM modes indication is also applicable to the OAM mode indication apparatus provided in the present disclosure, and will not be described in detail in the present disclosure.

Figure 9:
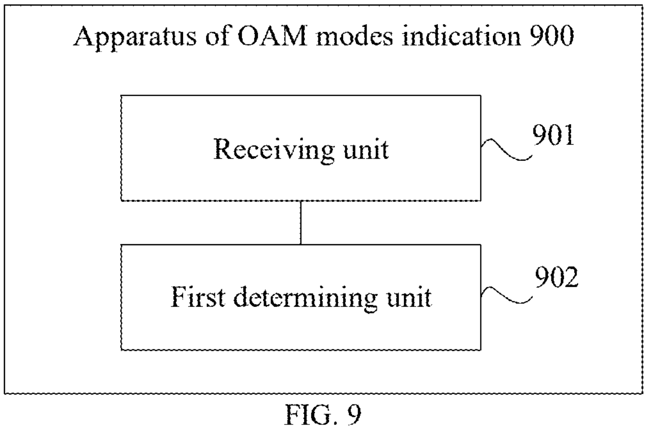
FIG. 9 is a block diagram of an apparatus of OAM modes indication according to an embodiment of the present disclosure.

FIG. 9 is a schematic structural diagram of an apparatus of OAM modes indication 900 according to an embodiment of the present disclosure, which may be applied to a first device, such as a base station.

As shown in FIG. 9, the apparatus 900 may include: a receiving unit 901 and a first determining unit 902.

The receiving unit 901 is configured receive first indication information reported by a second device.

The first determining unit 902 is configured to select, in response to the first indication information, an OAM mode as a target OAM mode for transmitting a target signal or control signaling.

In some embodiments of the present disclosure, the first indication information may be any one of the following, including: information of the first OAM mode; measurement values of respective OAM modes; and information of an antenna port corresponding to the first OAM mode; measurement values of respective antenna ports corresponding to the respective OAM modes; and where the first OAM mode being an OAM mode with a best transmission quality among available OAM modes determined by the second device according to the measurement values of the respective OAM modes.

In some embodiments of the present disclosure, the measurement values of the respective OAM modes or the measurement values of respective antenna ports corresponding to the respective OAM modes include any one of: a SINR measurement value of the corresponding OAM mode signal, an RSRP measurement value of the corresponding OAM mode signal, an RSRQ measurement value of the corresponding OAM mode signal, and an RSSI measurement value of the corresponding OAM mode signal.

Figure 10:
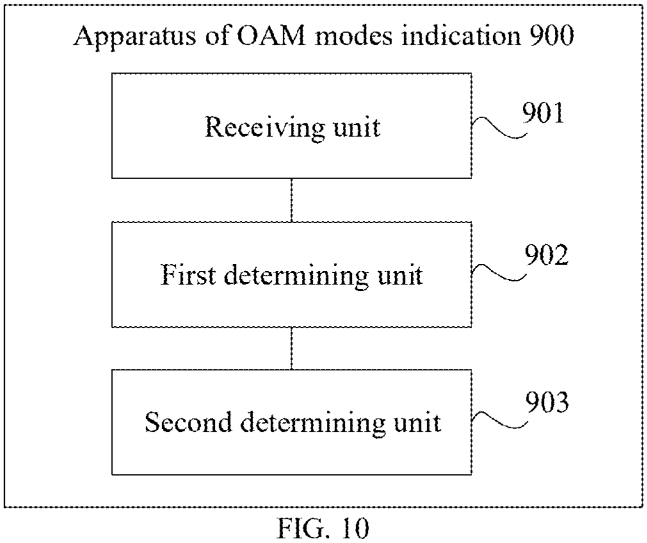
FIG. 10 is a block diagram of an apparatus of OAM modes indication according to an embodiment of the present disclosure.

In some embodiments of the present disclosure, as shown in FIG. 10, the apparatus 900 further includes: a second determining unit 903, configured to determine the target signal or control signaling carried by the target OAM mode, along with the receiving unit 901 and the first determining unit 902 previously described with reference to FIG. 9.

In some embodiments of the present disclosure, the second determining unit 903 determines the target signal or control signaling carried by the target OAM mode, including: determine, by the first device, the target signal or control signaling carried by the target OAM mode; or determine the target signal or control signaling carried by the target OAM mode according to a predetermined protocol agreement.

Figure 11:
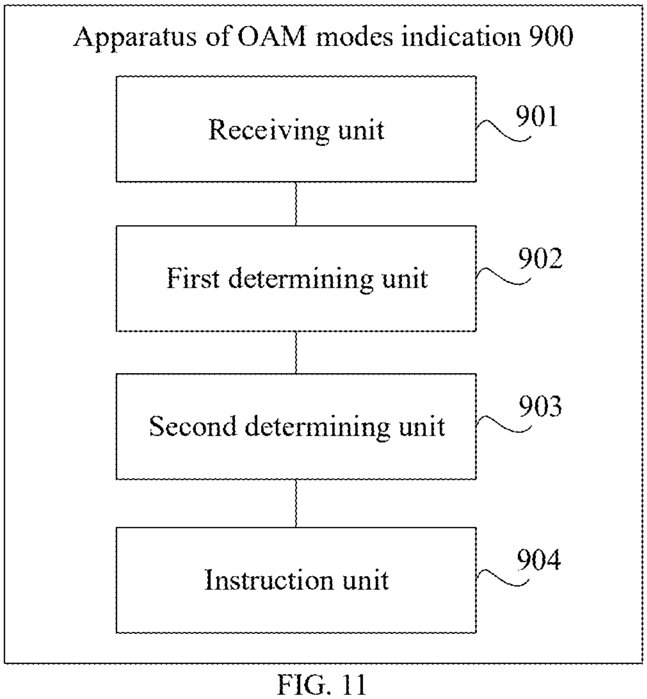
FIG. 11 is a block diagram of an apparatus of OAM modes indication according to an embodiment of the present disclosure.

In some embodiments of the present disclosure, as shown in FIG. 11, the apparatus 900 further includes, along with the features of FIGS. 9 and 10: an instruction unit 904, configured to instruct the second device to receive a corresponding target signal or control signaling on the target OAM mode.

In some embodiments of the present disclosure, the indication unit 904 instructs the second device to receive a corresponding target signal or control signaling on the target OAM, including: send second indication information to the second device, to instruct the second device to receive the corresponding target signal or control signaling on the target OAM mode, where the second indication information includes information of the target OAM mode.

In some embodiments of the present disclosure, in a case that respective OAM modes are mapped with corresponding antenna ports, mapping relationships between the respective OAM modes and the antenna ports are maintained or adjusted, so that the target OAM mode is mapped to a target antenna port.

In some embodiments of the present disclosure, the indication unit 904 sends second indication information to the second device, to instruct the second device to receive the corresponding target signal or control signaling on the target OAM mode, where the second indication information includes information of the target OAM, including: indicate, in response to determining that the respective OAM modes are not mapped with corresponding antenna ports, the target OAM mode to the second device through the second indication information, so as to instruct the second device to receive the corresponding target signal or control signaling on the target OAM mode.

In some embodiments of the present disclosure, the target signal or control signaling includes: a PT-RS, RRC signaling, an MAC CE, and physical layer control information.

Figure 12:
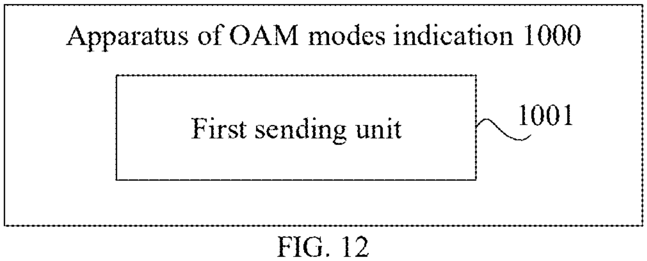
FIG. 12 is a block diagram of an apparatus of OAM modes indication according to an embodiment of the present disclosure.

FIG. 12 is a schematic structural diagram of an apparatus of OAM modes indication 1000 according to an embodiment of the present disclosure. The OAM mode indication apparatus 1000 may be applied to a second device, which may be, but not limited to, a terminal or a relay.

As shown in FIG. 12, the apparatus 1000 may include the first sending unit 1001, is configured to report first indication information to a first device, for the first device to select an OAM mode as a target OAM mode for transmitting a target signal or control signaling according to the first indication information.

In some embodiments of the present disclosure, the first indication information may be any one of the following, including: information of the first OAM mode; measurement values of respective OAM modes; information of an antenna port corresponding to the first OAM mode; and measurement values of respective antenna ports corresponding to the respective OAM modes; where the first OAM mode is an OAM mode with a best transmission quality among available OAM modes determined by the second device according to the measurement values of the respective OAM modes.

Figure 13:
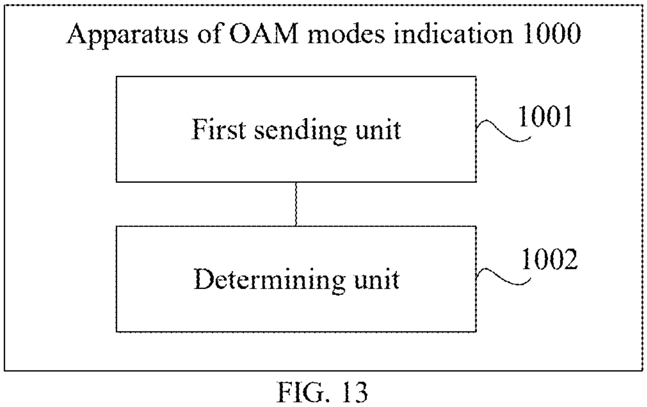
FIG. 13 is a block diagram of an apparatus of OAM modes indication according to an embodiment of the present disclosure.

In some embodiments of the present disclosure, as shown in FIG. 13, the apparatus 1000 further includes, along with the features of FIG. 12, a determining unit 1002, configured to determine an OAM mode corresponding to a maximum measurement value among the available OAM modes as the first OAM mode; or determine, among the available OAM modes, an OAM mode corresponding to an antenna port with a maximum measurement value as the first OAM mode.

In some embodiments of the present disclosure, the measurement values of the respective OAM modes or the measurement values of respective antenna ports corresponding to the respective OAM modes include any one of: a SINR measurement value of the corresponding OAM mode signal, an RSRP measurement value of the corresponding OAM mode signal, an RSRQ measurement value of the corresponding OAM mode signal, and an RSSI measurement value of the corresponding OAM mode signal.

Figure 14:
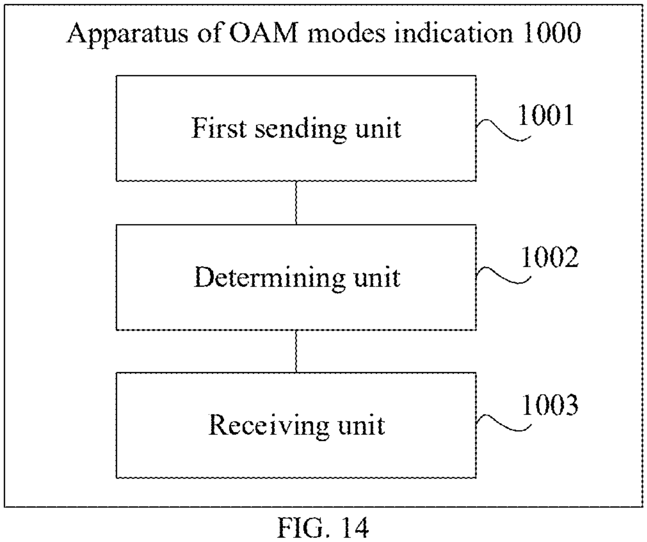
FIG. 14 is a block diagram of an apparatus of OAM modes indication according to an embodiment of the present disclosure.

In some embodiments of the present disclosure, as shown in FIG. 14, the apparatus 1000 further includes, along with the features of FIGS. 12 and 13, a receiving unit 1003, configured to receive indication information according to the target signal or control signaling of the first device, and receive a corresponding target signal or control signaling on the target OAM mode.

In some embodiments of the present disclosure, the receiving unit 1003 receives indication information according to the target signal or control signaling of the first device, and receives a corresponding target signal or control signaling on the target OAM mode, including: receive second indication information sent by the first device, and receive, in response to the second indication information, the corresponding target signal or control signaling on the target OAM mode indicated by the second indication information.

In some embodiments of the present disclosure, the target signal or control signaling includes: a PT-RS, RRC signaling, an MAC CE, and physical layer control information.

In some embodiments of the present disclosure, the target signal or control signaling includes: the target signal or control signaling carried by the target OAM mode determined by the first device; or the target signal or control signaling carried by the target OAM mode determined according to a predetermined protocol agreement.

In some embodiments of the present disclosure, in response to the target signal or control signaling carried by the target OAM mode being determined according to a protocol agreement, the corresponding target signal or control signaling is received on the target OAM mode according to the protocol agreement.

In some embodiments of the present disclosure, in a case that respective OAM modes are mapped with corresponding antenna ports, the target signal or control signaling are received at a target antenna port.

Figure 15:
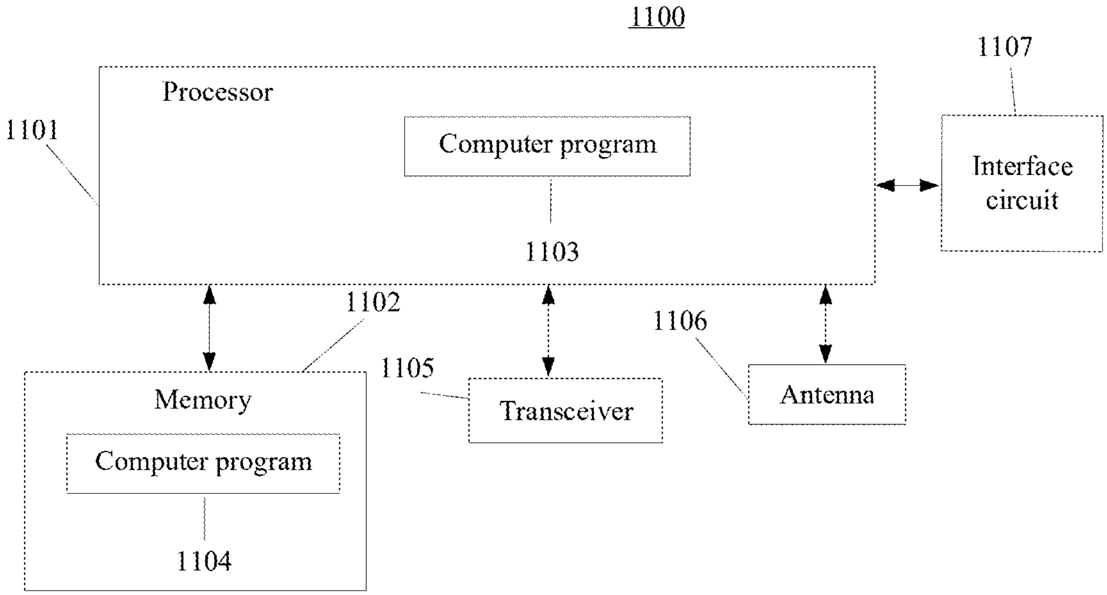
FIG. 15 is a schematic structural diagram of a communication apparatus according to an embodiment of the present disclosure.

Referring to FIG. 15, FIG. 15 is a schematic structural diagram of a communication apparatus 1100 according to an embodiment of the present disclosure. The communication apparatus 1100 may be a network device, a user equipment, a chip, a chip system, or a processor that supports network device to implement the above method, or a chip, a chip system, or a processor that supports user equipment to implement the above method. The apparatus can be configured to realize the methods described in the above-mentioned method embodiments, for details, please refer to the descriptions in the above-mentioned method embodiments.

The communication apparatus 1100 may include one or more processors 1101. The processor 1101 may be a general purpose processor or a specialized processor, etc. Such as a baseband processor or a central processing unit. The baseband processor can be configured to process communication protocols as well as communication data, and the central processor can be configured to control a communication apparatus (e.g., a base station, a baseband chip, a terminal device, a terminal device chip, a DU or a CU, etc.), execute a computer program, and process data from a computer program.

In some examples, the communication apparatus 1100 may further include one or more memories 1102, on which a computer program 1104 may be stored, and the processor 1101 executes the computer program 1104, so that the communication apparatus 1100 can execute the methods described in the above method embodiments. In some examples, data can also be stored in the memory 1102. The communication apparatus 1100 and the memory 1102 may be set separately or integrated together.

In some examples, the communication apparatus 1100 may further include a transceiver 1105 and an antenna 1106. The transceiver 1105 can be called a transceiver unit, a transceiver machine, a transceiver circuit, etc., and is configured to realize transceiver functions. The transceiver 1105 may include a receiver and a transmitter, and the receiver may be called a receiving machine or a receiving circuit, etc., and is configured to realize receiving functions. The transmitter can be named as a transmitting machine or a transmitting circuit, etc., and is configured to realize transmitting functions.

In some examples, the communication apparatus 1100 may further include one or more interface circuits 1107. The interface circuit 1107 is configured to receive code instructions and transmit them to the processor 1101. The processor 1101 executes the code instructions to cause the communication apparatus 1100 to perform the methods described in the above method embodiments.

In an implementation, the processor 1101 may include a transceiver for implementing receiving and transmitting functions. For example, the transceiver can be a transceiver circuit, an interface, or an interface circuit. The transceiver circuits, interfaces or interface circuits for receiving and transmitting functions can be separated or integrated. The transceiver circuit, interface or interface circuit can be configured to read and write codes/data, or the transceiver circuit, interface or interface circuit can be configured to signal transmission or delivery.

In an implementation, the processor 1101 can store a computer program 1103, and the computer program 1103 runs on the processor 1101, which can make the communication apparatus 1100 execute the methods described in the above-mentioned method embodiments. The computer program 1103 may be solidified in the processor 1101, in which case, the processor 1101 may be implemented by hardware.

In an implementation, the communication apparatus 1100 may include a circuit, which may realize the function of transmitting or receiving or communicating in the above-mentioned method embodiments. The processor and transceiver described in the present disclosure can be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and transceiver can also be manufactured by various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

Figure 16:
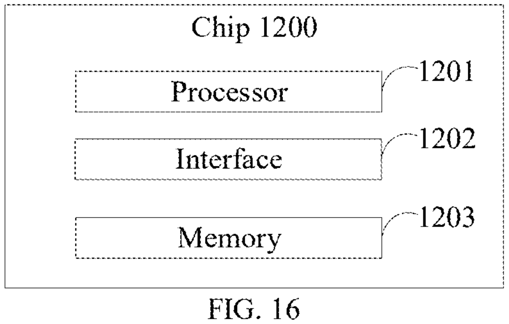
FIG. 16 is a schematic structural diagram of a chip according to an embodiment of the present disclosure.

The communication apparatus described in the embodiment may be a network device or a user equipment, but the scope of the communication apparatus described in the present disclosure is not limited thereto, and the structure of the communication apparatus may not be limited by FIG. 16. The communication apparatus may be a stand-alone device or may be part of a larger device. For example, the communication apparatus may be: (1) a stand-alone integrated circuit IC, or chip, or system or subsystem of chips; (2) a collection of ICs having one or more, in some examples, the collection of ICs may also include storage components for storing data, computer programs; (3) an ASIC, such as a modem; (4) a module that can be embedded in other devices; (5) a receiver, a terminal device, an intelligent terminal device, a cellular phone, a wireless device, handset, mobile unit, a vehicle-mounted device, a network device, a cloud device, an artificial intelligence device, etc.; and/or (6) others, etc.

For the case that the communication apparatus can be a chip or a chip system, please refer to a structural schematic diagram of the chip 1200 shown in FIG. 16. The chip 1200 shown in FIG. 16 includes a processor 1201 and an interface 1202. The number of processors 1201 may be one or more and the number of interfaces 1202 may be more than one.

In some examples, the chip 1200 further includes a memory 1203 for storing necessary computer programs and data.

Those skilled in the art can also understand that various illustrative logical blocks and steps listed in the embodiments of the present disclosure can be implemented by electronic hardware, computer software, or a combination of both. Whether such a function is realized in hardware or software depends on specific application and design requirements of an overall system. Those skilled in the art can use various methods to realize the described functions for each specific application, but this realization should not be understood as beyond the scope of protection of the embodiments of the present disclosure.

The present disclosure further provides a non-transitory computer-readable storage medium on which instructions are stored, which, when executed by a computer, realize the functions of any one of the above method embodiments.

The present disclosure further provides a computer program product which, when executed by a computer, realizes the functions of any one of the above method embodiments.

In the above embodiments, it can be realized in whole or in part by software, hardware, firmware or any combination thereof. When implemented using software, it may be implemented in whole or in part in the form of a computer program product. The computer program product includes one or more computer programs. When the computer program is loaded and executed on a computer, the flow or function according to the embodiments of the present disclosure is generated in whole or in part. The computer can be a general-purpose computer, a special-purpose computer, a computer network, or other programmable devices. The computer program can be stored in a computer-readable storage medium or transmitted from one computer-readable storage medium to another. For example, the computer program can be transmitted from a website, computer, server or data center to another website by wired (e.g., coaxial cable, optical fiber, digital subscriber line (DSL)) or wireless (e.g., infrared, wireless, microwave, etc.). The computer-readable storage medium may be any available medium that can be accessed by a computer or a data storage device such as a server, data center, etc. that contains one or more available media integrated. The available medium may be a magnetic medium (e.g., floppy disk, hard disk, magnetic tape), an optical medium (e.g., high-density digital video disc (DVD)), or a semiconductor medium (e.g., solid state disk (SSD)), etc.

A person of ordinary skill in the art may understand that "first", "second", and other various numerical numbers involved in the present disclosure are only described for the convenience of differentiation, and are not used to limit the scope of the embodiments of the present disclosure, nor do they indicate the order of precedence.

"At least one" in the present disclosure can further be described as one or more, and "a plurality" can be two, three, four or more, and the present disclosure is not limited. In the embodiment of the present disclosure, for a technical feature, the technical feature is distinguished by "first", "second", "third", "A", "B", "C" and "D" etc. The technical features described in "first", "second", "third", "A", "B", "C" and "D" are in no order of priority or size.

As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to the programmable processor, including machine-readable media that receive machine instructions as machine-readable signals. The term "machine-readable signal" refers to any signal used to provide machine instructions and/or data to the programmable processor.

The systems and techniques described herein may be implemented in a computing system that includes a backend component (e.g., as a data server), or a computing system that includes a middleware component (e.g., an application server), or a computing system that includes a frontend component (e.g., a user computer having a graphical user interface or a web browser through which a user may interact with implementations of the systems and techniques described herein), or any combination of such backend component, middleware component, or frontend component. Components of the system can be interconnected by any form or medium of digital data communication (for example, a communication network). Examples of the communication network include: a local area network (LAN), a wide area network (WAN) and an Internet.

A computer system may include a client and a server. The client and server are generally far away from each other and usually interact through a communication network. A relationship between client and server is generated by computer programs that run on a corresponding computer and have a client-server relationship with each other.

It should be understood that steps can be reordered, added or deleted using the various forms of flow shown above. For example, the steps described in the present disclosure can be executed in parallel, in sequence, or in different orders. As long as the desired results of the technical solution disclosed in the present disclosure can be achieved, there is no restriction here.

In addition, it should be understood that various embodiments described in the present disclosure can be implemented separately or in combination with other embodiments if the solution allows.

Those of ordinary skill in the art will appreciate that the units and algorithm steps of each example described in conjunction with the embodiments disclosed herein can be implemented with electronic hardware, or a combination of computer software and electronic hardware. Whether these functions are performed in hardware or software depends on the specific application and design constraints of the technical solution. Skilled people can use different methods to implement the described functions for each specific application, but such implementation should not be considered beyond the scope of the present disclosure.

It is clearly understood by those skilled in the field to which it belongs that, for the convenience and brevity of the description, the specific working processes of the above-described systems, apparatuses, and units can be referred to the corresponding processes in the foregoing embodiments of the method, and will not be repeated herein.

The foregoing are only specific embodiments of the present disclosure, but the scope of protection of the present disclosure is not limited thereto, and any person skilled in the art who is familiar with the technical field of the present disclosure can readily think of changes or substitutions within the technical scope of the present disclosure, which should be covered within the scope of protection of the present disclosure. Therefore, the scope of protection of the present disclosure based on the scope of protection of the claims.

The foregoing are only specific embodiments of the present disclosure, but the scope of protection of the present disclosure is not limited thereto, and any person skilled in the art who is familiar with the technical field of the present disclosure can readily think of changes or substitutions within the technical scope of the present disclosure, which should be covered within the scope of protection of the present disclosure. Therefore, the scope of protection of the present disclosure based on the scope of protection of the claims.

The invention claimed is:

1. A method of orbital angular momentum (OAM) modes indication, performed by a first device and comprising:

receiving first indication information reported by a second device; and selecting, in response to the first indication information, an OAM mode as a target OAM mode for transmitting a signal or control signaling, wherein the first indication information comprises at least one of:

information of a first OAM mode;

measurement values of respective OAM modes;

information of an antenna port corresponding to the first OAM mode; or measurement values of respective antenna ports corresponding to the respective OAM modes, wherein the first OAM mode is an OAM mode having a best transmission quality among available OAM modes as determined by the second device according to measurement values of the respective OAM modes.

2. The method according to claim 1, wherein the measurement values of the respective OAM modes or the measurement values of the respective antenna ports corresponding to the respective OAM modes comprise at least one of:

a signal to interference plus noise ratio (SINR) measurement value of a corresponding OAM mode signal;

a reference signal receiving power (RSRP) measurement value of the corresponding OAM mode signal;

a reference signal receiving quality (RSRQ) measurement value of the corresponding OAM mode signal; or a received signal strength indicator (RSSI) measurement value of the corresponding OAM mode signal.

3. The method according to claim 1, further comprising:

determining the signal or control signaling carried by the target OAM mode.

4. The method according to claim 3, further comprising:

instructing the second device to receive a corresponding signal or control signaling on the target OAM mode.

5. The method according to claim 4, wherein the instructing the second device to receive the corresponding signal or control signaling on the target OAM mode comprises:

sending second indication information to the second device to instruct the second device to receive the corresponding signal or control signaling on the target OAM mode, wherein the second indication information comprises information of the target OAM mode.

6. The method according to claim 3, wherein the determining the signal or control signaling carried by the target OAM mode comprises:

determining, according to a predetermined protocol agreement, the signal or control signaling carried by the target OAM mode.

7. The method according to claim 1, wherein, in a case that respective OAM modes are mapped with corresponding antenna ports, the method further comprises:

maintaining or adjusting mapping relationships between the respective OAM modes and the corresponding antenna ports so that the target OAM mode is mapped to an antenna port.

8. The method according to claim 5, wherein the sending second indication information to the second device comprises:

in response to determining that the respective OAM modes are not mapped with corresponding antenna ports, indicating the target OAM mode to the second device through the second indication information so as to instruct the second device to receive the corresponding signal or control signaling on the target OAM mode.

9. The method according to claim 1, wherein the signal or control signaling comprises at least one of:

a phase tracking reference signal (PT-RS);

radio resource control (RRC) signaling;

an enhanced media access control (MAC) control element (CE); or physical layer control information.

10. A method of orbital angular momentum (OAM) modes indication, performed by a second device and comprising:

reporting first indication information to a first device, for the first device to select an OAM mode as a target OAM mode for transmitting a signal or control signaling according to the first indication information, wherein the first indication information comprises at least one of:

information of a first OAM mode;

measurement values of respective OAM modes;

information of an antenna port corresponding to the first OAM mode; or measurement values of respective antenna ports corresponding to the respective OAM modes, wherein the first OAM mode is an OAM mode having a best transmission quality among available OAM modes as determined by the second device according to measurement values of the respective OAM modes.

11. The method according to claim 10, further comprising:

determining an OAM mode corresponding to a maximum measurement value among the available OAM modes as the first OAM mode; or determining, among the available OAM modes, an OAM mode corresponding to an antenna port with a maximum measurement value as the first OAM mode.

12. The method according to claim 11, wherein the measurement values of the respective OAM modes or the measurement values of the respective antenna ports corresponding to the respective OAM modes comprise at least one of:

a signal to interference plus noise ratio (SINR) measurement value of a corresponding OAM mode signal;

a reference signal receiving power (RSRP) measurement value of the corresponding OAM mode signal;

a reference signal receiving quality (RSRQ) measurement value of the corresponding OAM mode signal; or a received signal strength indicator (RSSI) measurement value of the corresponding OAM mode signal.

13. The method according to claim 12, further comprising:

receiving indication information according to the signal or control signaling of the first device; and receiving a corresponding signal or control signaling on the target OAM mode.

14. The method according to claim 13, wherein the receiving indication information according to the signal or control signaling of the first device and receiving the corresponding signal or control signaling on the target OAM mode comprises:

receiving second indication information sent by the first device; and receiving, in response to the second indication information, the corresponding signal or control signaling on the target OAM mode indicated by the second indication information.

15. The method according to claim 12, further comprising:

in response to the signal or control signaling carried by the target OAM mode being determined according to a protocol agreement, receiving the corresponding signal or control signaling on the target OAM mode according to the protocol agreement.

16. The method according to claim 10, further comprising:

in a case that respective OAM modes are mapped with corresponding antenna ports, receiving the signal or control signaling at a corresponding antenna port.

17. The method according to claim 10, wherein the signal or control signaling comprises at least one of:

a phase tracking reference signal (PT-RS);

radio resource control (RRC) signaling;

an enhanced media access control (MAC) control element (CE); or physical layer control information.

18. A communication device, comprising:

a transceiver;

a memory; and a processor connected to the transceiver and the memory, and configured to control radio signal transmission and reception of the transceiver by executing computer-executable instructions stored in the memory, to:

receive first indication information reported by a second device; and select, in response to the first indication information, an orbital angular momentum (OAM) mode as a target OAM mode for transmitting a signal or control signaling, wherein the first indication information comprises at least one of:

information of a first OAM mode;

measurement values of respective OAM modes;

information of an antenna port corresponding to the first OAM mode; or measurement values of respective antenna ports corresponding to the respective OAM modes, wherein the first OAM mode is an OAM mode having a best transmission quality among available OAM modes as determined by the second device according to measurement values of the respective OAM modes.

* * * * *